Oct. 30, 1956 R. S. THATCHER 2,768,752
PARALLEL FOLDED FILTER
Filed Feb. 14, 1950

Inventor
Russell S. Thatcher
By Willits, Helwig & Baillio
Attorneys

United States Patent Office 2,768,752
Patented Oct. 30, 1956

2,768,752
PARALLEL FOLDED FILTER

Russell S. Thatcher, Flint, Mich., assignor to General Motors Corporation, Detroit, Mich., a corporation of Delaware Application February 14, 1950, Serial No. 144,065

2 Claims. (Cl. 210—169)

This invention relates to filters and more particularly to a surface filter of sheet material construction.

The oil filter has a plurality of surface filter areas arranged in parallel rows to fit the internal shape of the container employed. A long strip or ribbon of rough filter material, such as, paper, which may be resin impregnated to retain its strength when wet, is reversely folded to make a series of filter areas. The inner sides of these double walled filter areas are in contact and the roughness of the filter paper provides the space for the drainage of the filtrate. The outside surfaces of the adjacent double walled filter areas are uniformly spaced apart sufficiently to allow the fluid to flow into the filter areas and to minimize the loss of capacity due to the accumulation of sludge. In constructing a cylindrical filter of this type, the drainage passage extends the full length of the unit and the full diameter with an enlargement at the center. The reversely bent folds are arranged parallel to each other and perpendicular to the central drain passage for maximum utility of the surface. The folds are externally spaced to allow ingress of the fluid and internally are in contact so that they can support the pressure under which the filter operates. The folds are symmetrically arranged on opposite sides of the drain passage and the end edges are sealed together to form a filter unit surrounding the drain passage. The filter unit is secured at its ends by gluing the top and bottom edges of the filter material to end plates.

A primary object of the invention is to provide an improved surface filter having a maximum effective filter area per unit of volume.

Another object of the invention is to provide an improved surface filter unit with longitudinally disposed pleats arranged in parallel rows in a surface filter unit.

Another object of the invention is to provide an improved surface filter unit with a plurality of parallel rows of surface filter elements arranged on both sides of a perforated hollow partition wall.

Another object of the invention is to provide an improved surface filter unit having a plurality of longitudinal filter pleats with the external surfaces spaced to provide ingress of the fluid and the internal walls in contact to support the filter surfaces.

Another object of the invention is to provide a central drainage passage for a filter unit having a plurality of perforated walls contacting each other with filtering elements positioned on each side of the walls.

These and other objects of the invention will be more fully explained in the following description and drawing of a preferred embodiment of the invention.

Figure 1:
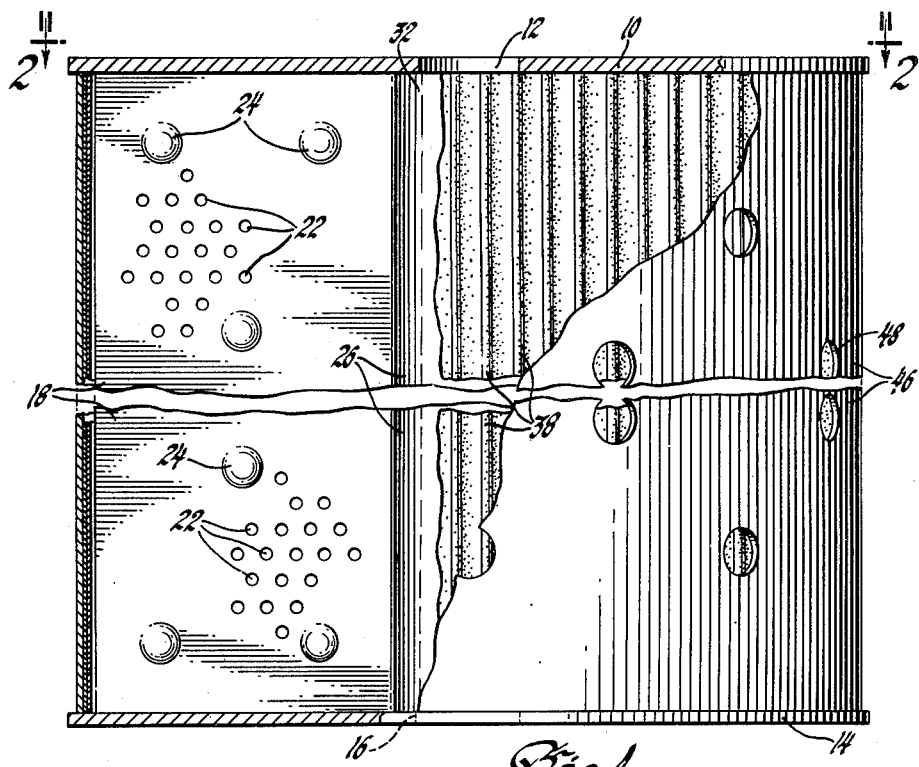
Figure 1 shows a side view of the filter unit with parts broken away and in section.
Figure 2:
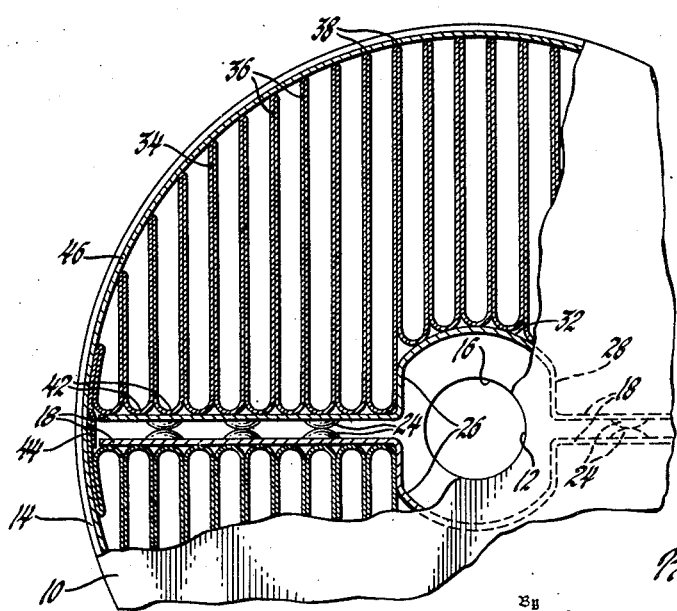
Figure 2 shows a partial section view on the line 2—2 of Figure 1, with parts broken away and in section.

The filter unit shown in the accompanying drawing is designed to fit in a conventional filter housing having a central post and suitable inlet and outlet connections. A filter housing of this type is shown in the copending application of John Gretzinger, Serial No. 58,283, filed November 4, 1948. The filter unit has a top plate 10 with a central aperture 12 and a bottom plate 14 with a central aperture 16. The end plates 10 and 14 are positioned in alignment and have a central partition extending across the center. The partition consists of two walls 18 arranged in back to back relation. The walls 18 have perforations 22 throughout their areas to allow the oil to pass through and bosses 24 to maintain the walls in spaced relation. As shown in Figure 2, the bosses 24 of each wall are aligned to maintain a space between the walls equal to the height of both the bosses. At the center of each wall 18, longitudinal offset portion 26 provides an enlarged central passage through the filter in alignment with the openings 12 and 16 in the end plates. The offset portion 26 has a short flat portion 28 perpendicular to the wall 18 at each side of the offset portion. The central portion of the offset is connected by a curved portion 32. The offset portions 26 of each wall 18 extend in the opposite direction to form a symmetrical central drainage passage in the center of the oil filter.

The surface filter unit is formed of an elongated strip or sheet of filter material 34 folded to form a plurality of double wall sections or pleats 36 of varying length. The double wall sections 36 are arranged in parallel relation to each other and perpendicular to the flat portion of walls 18. The double wall portions 36 are folded sharply at the outer end 38 so that the interior surfaces in contact with the filtered fluid are in contact with each other and thus support each other against the pressure of the unfiltered fluid. The strip 34 of filter material has a rounded fold 42 between each double wall portion 36. The rounded fold 42 thus allows each double wall portion 36 to be spaced apart sufficiently to provide for the flow of unfiltered fluid between the adjacent double wall portions. The rounded folds 42 also rest against the wall portion 18 and the rounded portion 32 of the central partition. It will be noted that the flat side portion 28 on the central offset or channel 26 provides side support for a portion of the adjacent filter wall portion that is unsupported by another filter wall. The double wall portions 36 are made in varying length to substantially fill the space within the edges of the end plates 10 and 14. This pattern is symmetrical on each side of the partition 18. The filter strip 34 may be folded so that one strip is employed with a single joint 44 at one side of the filter. The joint 44 may be glued with suitable waterproof adhesive. A similar joint may be employed if desired at the opposite side of the filter. The filter may also be made without seams from an endless strip. The end edges of the filter strip are suitably secured and sealed to the end plates 10 and 14 by a suitable adhesive or resin compound. In order to protect the filter unit in handling, it is advisable to prepare a cylindrical protector or cover 46 of heavy paper, cardboard or metal which has suitable apertures 48 around the filter unit.

Figure 3:
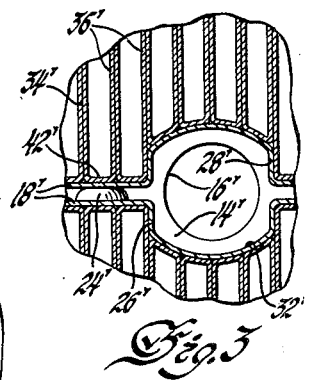
Figure 3 shows a partial section of a modification.

In the modified form of the invention shown in Figure 3, the strip of filter material 34' is folded and secured between the end plates in substantially the same manner. A portion of the strip 34' and the lower end plate 14' with aperture 16' is shown. The partition members 18' with the central offset portion 32' around the aperture 16' may bisect the end plates. The partition members are maintained in spaced relation by bosses 24' projecting from a partition member. The sides 26' and 28' of the offset portion 32' are flat so that they will support the filter strip. The filter strip 34' is folded to form a plurality of double wall filter sections 36' which are sealed to the end plates at the top and bottom. Where higher pressures are used the inner folds 42' engaging the flat partition are made square and the folds engaging the curved surface 32' are shaped to conform thereto. Thus, the filter material strip 34' is fully supported and will support very high pressures.

The unfiltered fluid or oil will enter the filter housing under pressure and surround this filter unit. The apertures 12 and 16 in the end plates will be blocked by the central post or drainage passage in the filter housing, thus the oil will be forced to flow through the apertures 48 in the protector cover 46 and will enter into the spaces between the edge of the adjacent and parallel double wall filter portions 36. This parallel arrangement of continuous filter surfaces provides a greater filter area for the volume than any other type filter. The parallel filter surfaces also allow a uniform space between the surfaces in contact with the unfiltered fluid so that the sludge or deposit will not prematurely clog the filter. The walls of these double walled portions are maintained in spaced relation sufficient to allow passage of oil between them by the rough texture of the filter material. It is also pointed out that due to the parallel arrangement of the walls there is no crowding of the interior of the walls at the center of the filter which would tend to stop the proper drainage of the filtrate. Due to this contact the rough surface area of the filter wall sections 36 will support a large fluid pressure. The flat side portion 28 supports the portion of the filter material that is not supported by being in contact with the back of an adjacent filter surface. The oil then flows through the walls and then flows between the double walls 36 toward the central partitions 18. There the oil passes through the apertures 22 and through the space between the walls 18. The oil is then collected in the central drainage passage formed between the offset portions 26 and flows out through the central walls or apertures.

This preferred embodiment is illustrative of the invention and may be modified in various ways within the terms of the appending claims.

What is claimed is:

1. In a filter element, a pair of opposed end plates, a pair of perforated partition members extending longitudinally between said end plates and transversely across each of said end plates, said pair of partition members being spaced apart to provide a drainage space between the adjacent faces of said partition members, a channel depressed in the adjacent faces of each partition member, said channels facing each other to form an enlarged passage between said partition members, said channels extending substantially longitudinally of said partition members and terminating at the edges of each partition member adjacent one end plate, an aperture in said one end plate between said partition members and in alignment with said enlarged passage, an endless strip of filter material extending around said partition members and formed into spaced outwardly extending pleats each having walls with faces in substantially continuous contact throughout their lengths and close up to one of said partition members, the edges of said strip of filter material being secured to said end plates.

2. A filter element comprising a pair of end plates, spacing means mounted between and contacting said end plates and through which liquid may pass, a one-layer strip of filter material surrounding said spacing means and folded transversely to form a plurality of outwardly extending pleats and intervening parts arranged alternately therewith, said pleats and parts defining open pockets and having edges joined to said end plates, each of said intervening parts having a substantial widthwise area contact with the outside of said spacing means, the oposing inner surfaces of the sheet material in each of said pleats being contiguous substantially throughout their lengths, the opposed outer walls of adjacent pleats defining each of said open pockets being spaced at all points from each other, and the said spacing means includes perforated partitions mounted between and extending substantially across said end plates, offset channel portions formed in said partitions and having flat sides, said filter material being of rough texture, said open pockets being of substantially uniform width for reception of liquid to be treated, and sides of some of said outer walls being disposed in parallel and contactual relation with said flat sides for support thereby.

References Cited in the file of this patent
UNITED STATES PATENTS

| | | |
|---|---|---|
| 1,963,945 | Lyman, et al. | June 19, 1934 |
| 2,337,579 | Walker, et al. | Dec. 28, 1943 |
| 2,395,449 | Briggs | Feb. 26, 1946 |
| 2,468,862 | Briggs | May 3, 1949 |
| 2,488,726 | Judkins | Nov. 22, 1949 |
| 2,491,180 | Horthy | Dec. 13, 1949 |
| 2,569,243 | Kovacs | Sept. 25, 1951 |

FOREIGN PATENTS

| | | |
|---|---|---|
| 46,881 | France | Oct. 30, 1936 |
| 886,736 | France | Oct. 22, 1943 |